(12) United States Patent
Coudron et al.

(10) Patent No.: US 8,332,381 B1
(45) Date of Patent: Dec. 11, 2012

(54) TAB SEARCH UTILITY

(75) Inventors: Jonathan Coudron, Minneapolis, MN (US); Stephen Wise, Minneapolis, MN (US)

(73) Assignee: Search Results, LLC, Minneapolis, MN (US)

( * ) Notice: Subject to any disclaimer, the term of this patent is extended or adjusted under 35 U.S.C. 154(b) by 0 days.

(21) Appl. No.: 13/298,180

(22) Filed: Nov. 16, 2011

Related U.S. Application Data (60) Provisional application No. 61/558,221, filed on Nov. 10, 2011.

(51) Int. Cl.
 *G06F 17/30* (2006.01)
 *G06F 3/048* (2006.01)
(52) U.S. Cl. ........................ 707/706; 715/780
(58) Field of Classification Search .................. 707/706; 715/780
 See application file for complete search history.

(56) References Cited

U.S. PATENT DOCUMENTS

| | | | |
|---|---|---|---|
| 2006/0282795 A1* | 12/2006 | Clark et al. | 715/840 |
| 2007/0043712 A1* | 2/2007 | Ramberg | 707/3 |
| 2008/0005686 A1* | 1/2008 | Singh | 715/764 |
| 2009/0327947 A1* | 12/2009 | Schreiner et al. | 715/777 |
| 2010/0306237 A1* | 12/2010 | Chandley et al. | 707/769 |

* cited by examiner

*Primary Examiner* — Amresh Singh
(74) *Attorney, Agent, or Firm* — Schwegman Lundberg Woessner P.A.

(57) ABSTRACT

Some embodiments herein include at least one of systems, methods, and software for presenting within an Internet browsing application a search box adjacent to the last tab in the tabbed area of the Internet browsing application. The search box, in some embodiments, receives text input of a search query, adds to the search query at least one tracking code associated with at least one of a user and the Internet browsing application, and submits the query and tracking code combination against at least one search engine.

21 Claims, 7 Drawing Sheets

TAB SEARCH UTILITY

CLAIM OF PRIORITY

This application claims the benefit of priority under 35 U.S.C. 119(e) to U.S. Provisional Patent Application Ser. No. 61/558,221, filed on Nov. 10, 2011, the benefit of priority of which is claimed hereby, and of which is incorporated by reference herein in its entirety.

BACKGROUND

Software publishers, especially those who offer free software, often seek to generate revenue by bundling their software with "monetizing" search toolbars—Internet browser add-ons that generate revenue based on Internet searches submitted by users via the toolbar. However, toolbars take up valuable viewing space in the Internet browser and reduce the area available for viewing the contents of web pages. Consequently, most users who install these search toolbars end up uninstalling the search toolbar within days of its installation, and as a result, terminating the revenue stream from the search toolbar.

DETAILED DESCRIPTION

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
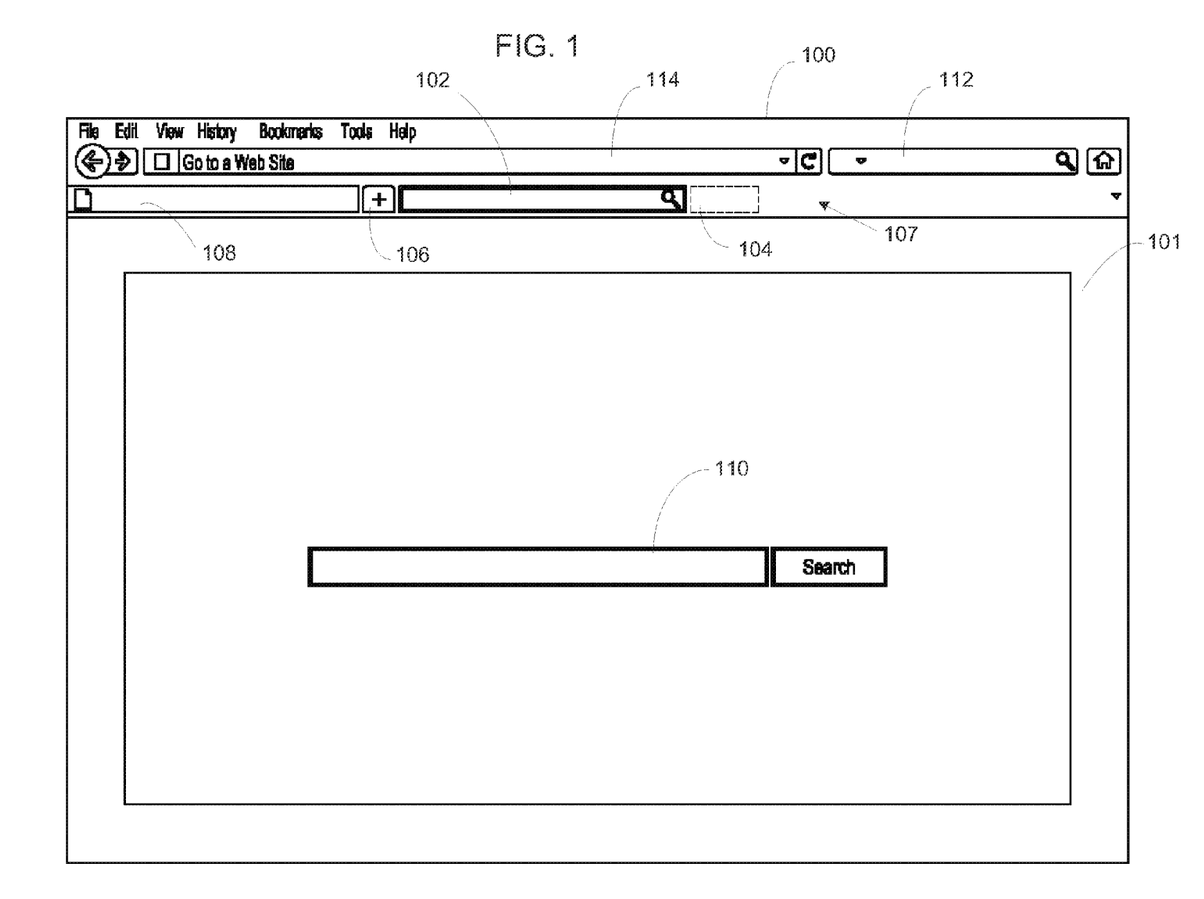
FIG. 1 is a functional diagram of the tab search utility in accordance with some embodiments.

FIG. 1 illustrates an example embodiment of an Internet browsing application 100 with the tab search utility installed. The tab search utility causes the Internet browsing application 100 to display a tab search box 102 in the tab area 107 of the Internet browsing application 100. The Internet browsing application 100 also includes one or more tabs 108 that are presented in the tab area 107. New tabs 108 may be created by clicking on the new tab button 106, which also is presented in the tab area 107. Web content associated with an active tab 108 is displayed in content area 101 of the Internet browsing application 100. The Internet browsing application 100 also includes an address bar 114 and may include a default search box 112. At least a portion of the content displayed in the content area 101 is retrieved by the Internet browsing application 100 from a location identified in the address bar 114. The tab search box 102 may include a button 104 to submit a search query based on text entered by a user in the tab search box 102. The button 104 in some other embodiments may be associated with additional content. For example, the text or graphic presented within the button may be obtained from a third party and selection of the button 104 may cause the Internet browsing application 100 to retrieve and present yet further content from the third party or other source accessible by the Internet browsing application. The Internet browsing application 100 may display a start/home page when first run; the content of this start/home page may contain a search box 110. The content of a new tab 108 may also contain a search box 110.

In some embodiments, the tab search box 102 is displayed in the tab area 107 adjacent to the last tab 108 of the Internet browsing application 100. In some embodiments, particularly when displayed in an Internet browsing application 100 customized for readers of left-to-right languages, such as English, the tab search box 102 will be displayed just to the right of the rightmost tab 108. In some embodiments, particularly when displayed in an Internet browsing application 100 customized for readers of right-to-left languages, such as Hebrew, the tab search box 102 will be displayed just to the left of the leftmost tab 108. In some embodiments, the tab area 107 may alternatively be presented below the content area 101. In yet further embodiments, the tab area 107 may alternatively be presented to the left or to the right of the content area 101 and the tabs 108 may be presented vertically, as opposed to horizontally as illustrated in FIG. 1, starting at either the top or the bottom and the tab search box 102 presented adjacent to a bottom-most or upper-most tab 108, respectively.

In some embodiments, the tab search box 102 may be displayed at the top of the window of the Internet browsing application 100. In some such embodiments, the tab area 107 is in top area of the Internet browsing application 100 window and the tab search box 102 is presented therein.

In some embodiments, the tab search box 102 contains a visual output including a control button 104 located in or next to the search box, the control button 104 presenting content from a third party. The content from the third party may be an entity that provides or operates the tab search utility. The content may display a current balance of loyalty points, or other cumulative account balance, earned by the user in conjunction with the tab search utility. Other content renderable within the tab search box 102 or the control button 104 may also be obtained periodically and rendered. Such content can include a background color for one or both of the tab search box 102 and the control button 104. The color may indicate a loyalty reward level, such as a green color for an infrequent user and a gold color for a regular user. The other content may also, or alternatively, include icons, images, text, and the like that may be rendered in one or both of the tab search box 102 and the control button 104. In some further embodiments, one or more sound file may be associated with one or both of the tab search box 102 and the control button 104 that is played by the tab search utility upon occurrence of an event, such as a search being submitted, a loyalty point level reached, and other events. The content may be default content included with the tab search utility. The content, in some embodiments, may also or alternatively be content that is downloaded periodically along with configuration settings as discussed further below.

A user may submit a search query to one or more search engines by entering text into the tab search box 102, the address bar 114, the default search box 112, or a search box 110 contained in either a start/home page or a new tab page. The tab search utility may intercept searches submitted through one or more of these searching tools other than the tab search box 102. The intercepted searches and searches received via the tab search box 102 are then submitted to one or more search engines as configured within the tab search utility. In some embodiments, the tab search utility aggregates the obtained search results and presents them via a web page within the Internet browsing application. In some embodiments, the tab search utility redirects the user to a web page containing the search results. In other embodiments, the tab search utility may only collect data and statistics with regard to searches submitted via the various mechanisms through which a user may be submitting searches, such as by monitoring Hypertext Transfer Protocol data being sent and received by or on behalf of the user by a computer.

Figure 2:
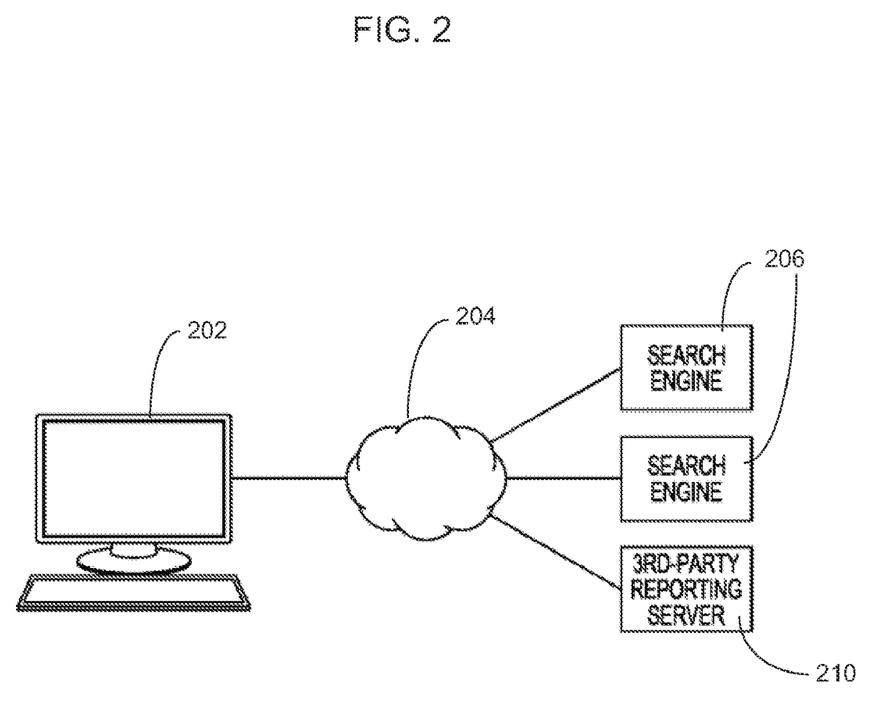
FIG. 2 is an architecture diagram of a system using the tab search utility in accordance with some embodiments.

FIG. 2 illustrates an example embodiment of a system including a computer 202 executing Internet browsing application 100 for Internet browsing and searching. Computer 202 sends search queries submitted by a user using the Internet browsing application 100, which has the tab search utility including the tab search box 102 installed, to one or more search engines 206 via the Internet 204. Computer 202 may also send search and usage data to a third-party reporting server 210. The usage data may be used for various purposes by the third party operating the reporting server 210. The third-party reporting server 210, in some embodiments, may itself or communicate with one or more servers that are not illustrated in FIG. 2 to track usage statistics, reward loyalty provide content, and provide configuration settings to the tab search utility present on the computer 202 and other computers.

Figure 3:
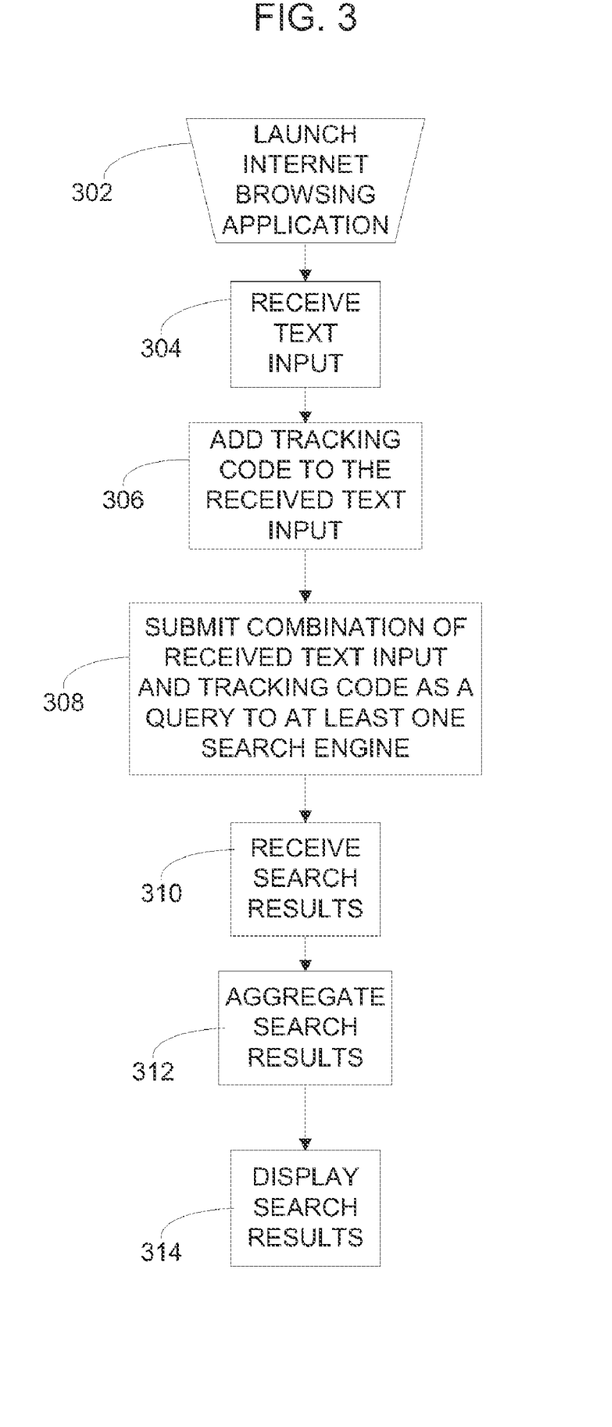
FIG. 3 is a block flow diagram of a method according to an example embodiment.

FIG. 3 is a block flow diagram of a method according to an example embodiment. The method of FIG. 3 illustrates one example embodiment of searches performed via the tab search utility. In some embodiments, after the Internet browsing application 100 is launched by the user 302, the tab search utility may receive 304 text input into one or more of the tab search box 102, the address bar 114, the default search box 112, or a search box 110 contained in web page presented by the Internet browsing application, such as a home page or other web page.

After receiving the text input, the tab search utility may add 306 at least one tracking code to the received input. The tracking code is typically a tracking code for searches to be submitted to a specific search engine and associated with the user, but may also or alternatively be associated with the computer upon which the Internet browsing application 100 is executing, an owner of the computer upon which the Internet browsing application 100 is executing, an entity such as a company or non-profit organization for whom search loyalty rewards will accumulate for, or other process, device, person, or entity having an account. Such tracking codes, and other tracking codes, may also be associated with a provider of the tab search utility as disclosed herein. A tracking code associated with the provider of the tab search utility may be used to track one or more of searches performed, links selected, and revenue accumulated as a result of tab search utility usage. For example, a tracking code added to a search for submission to a particular search engine will be used by the search engine to credit an account as compensation for routing the search to that search engine. The tab search utility then submits to at least one search engine 206 the combination of received text input and one or more tracking codes as a search query 308. In sonic embodiments, the tab search utility submits search queries only to those search engines 206 with whom the software publisher has a revenue-sharing agreement.

In some embodiments, after the tab search utility receives the search results 310 from one or more search engines 206, the tab search utility aggregates the search results 312 and displays the search results 314 in a new tab of the Internet browsing application 100. In some embodiments, after the tab search utility receives the search results 310 from one or more search engines 206, the tab search utility redirects the user to a web page containing the search results, and causes the Internet browsing application 100 to display the web page containing the search results in a new tab. The aggregating of the search results may include reordering the search results based on which search engine the particular search results are received from, a website a search result links to, a particular configuration setting, a user preference, and the like.

Figure 4:
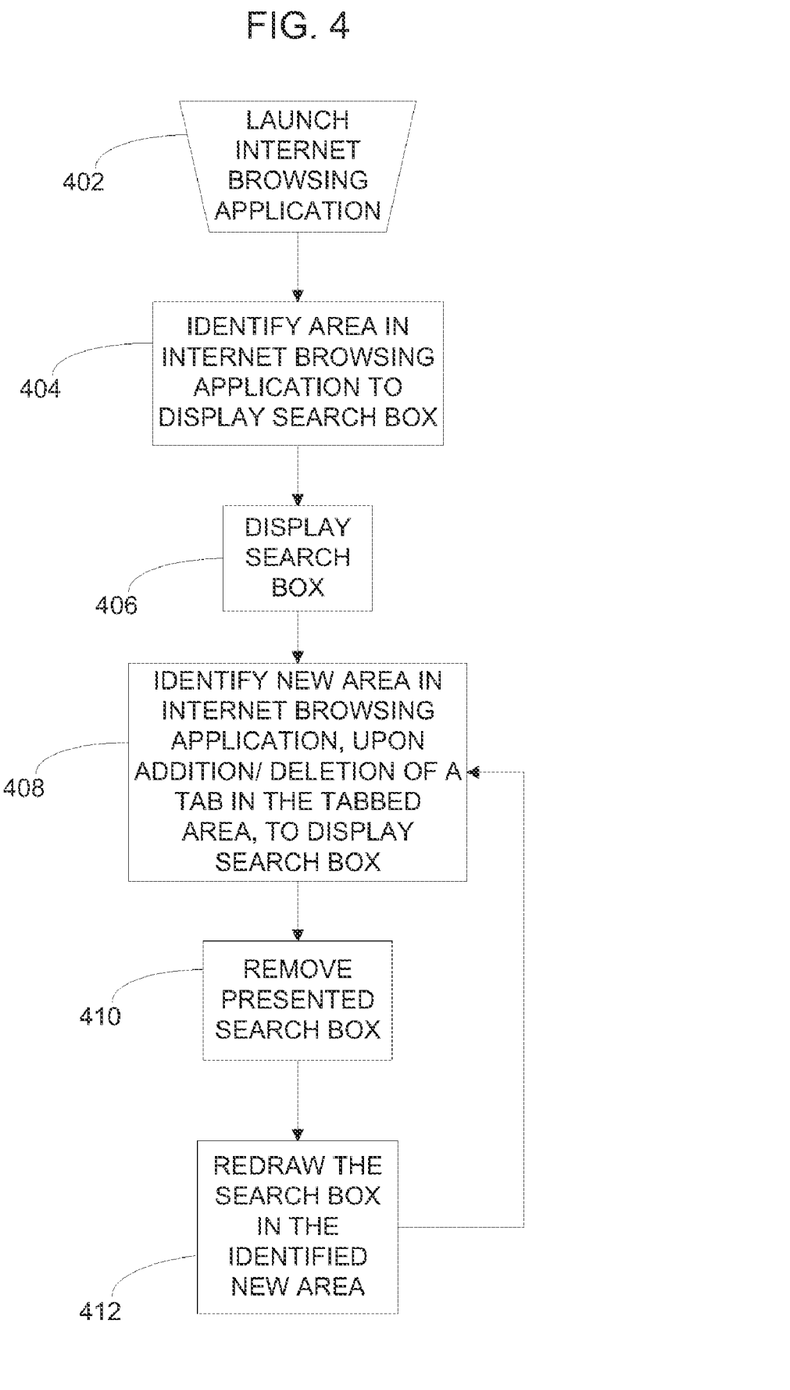
FIG. 4 is a block flow diagram of a method according to an example embodiment.

FIG. 4 is a block flow diagram of a method according to an example embodiment. The method of FIG. 4 is an example, according to some embodiments, of operation of the tab search utility for placing the tab search box 102 within an Internet browsing application 100. After the Internet browsing application 100 is launched by the user 402, the tab search utility identifies 404 an area of the tab area 107 of the Internet browsing application 100 in which the tab search box 102 should be displayed. Once the area is identified, the tab search box is then displayed 206 in that area.

Upon addition of a new tab or deletion of an existing tab in the tab area 107, the tab search utility identifies 408 a new area of the tab area 107 of the Internet browsing application 100 in which the tab search box 102 should be displayed. The tab search utility may then remove 410 the currently presented tab search box 410 and redraws 412 the tab search box 102 in the newly indentified area. This process repeats upon addition or removal of a tab within the Internet browsing application 100.

Figure 5:
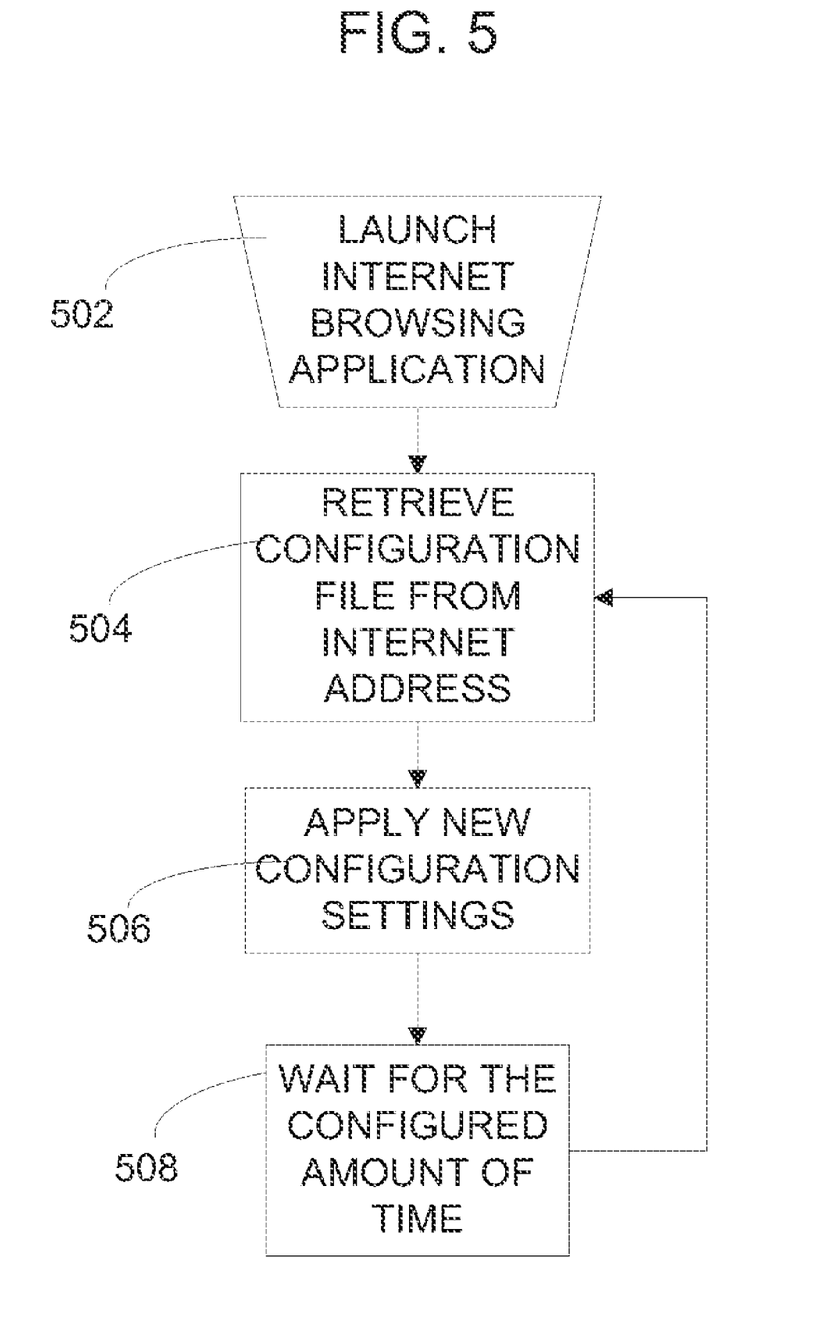
FIG. 5 is a block flow diagram of a method according to an example embodiment.

FIG. 5 is a block flow diagram of a method according to an example embodiment. The method of FIG. 5 is an example, according to some embodiments, of the operation of the tab search utility for retrieving configuration files. After the Internet browsing application 100 is launched by the user 502, the tab search utility may retrieve a new configuration file, or portions or data included therein, from an Internet address 504 that is specified in the current configuration file to obtain configuration settings. Newly obtained configuration settings 506 may then be applied by replacing the existing configuration settings or an entire configuration file when a new configuration file is downloaded. The tab search utility may then wait for a configured amount of time 508, such as a matter of minutes, days, weeks, or other period, and again retrieve the configuration file, or portions or data included therein, from an Internet address 504 that is specified in the current configuration file, and again applies the new configuration settings 506 in a like manner. This process may repeat while the Internet browsing application is executing.

In some embodiments, the configuration file and configuration settings represented therein may include one or more of a list of search engines available for use, a tracking code for each search engine in the list, one search engine from the list that is marked as the default search engine, content for a search page on any new tab, and reporting configurations.

In some embodiments, the tab search utility may allow a user to select from a list of search engines to which the tab search utility should submit search queries. In some embodiments, this selection is stored in the configuration file.

Figure 6:
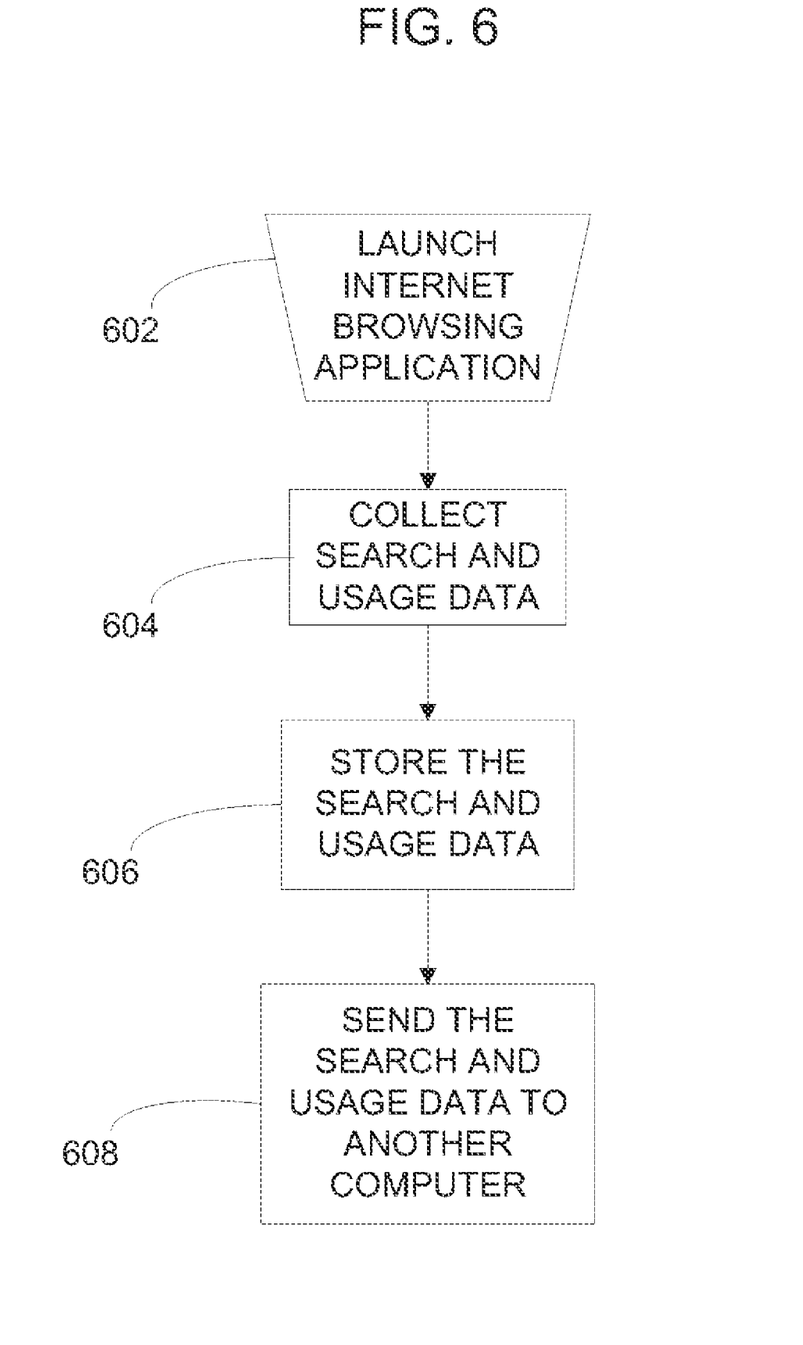
FIG. 6 is a block flow diagram of a method according to an example embodiment.

FIG. 6 is a block flow diagram of a method according to an example embodiment. The method of FIG. 6 is an example, according to some embodiments, of the operation of the tab search utility for reporting search and usage data. After the Internet browsing application 100 is launched by the user 602, the tab search utility collects search and usage data 604 as the user interacts with the Internet browsing application 100. In some embodiments, the tab search utility stores the search and usage data 606 in local storage of the computer executing the Internet browsing application 100. In some embodiments, the tab search utility periodically sends, via the Internet 204, the search and usage data to another computer 608, the period specified in the configuration file.

In some embodiments, the tab search utility communicates with one or more servers that are implemented to support the tab search utility present on multiple computers. The one or more servers may provide configuration settings to the various tab search utility instances. The one or more servers may also receive searches from the tab search utility instances and based on an individual search received from a particular tab search utility instance, instruct the tab search utility so submit the search to a particular search engine. The particular search engine in such embodiments may be selected by a process that executes on the one or more servers based on a search engine that is likely to provide the most relevant results, a business rule that may be tied to revenue the search may generate for an operator of the one or more servers, response times of various search engines, and other rules which may be technical or business in nature.

The one or more servers may collect information, data, and statistics with regard to searches received from the various tab search utilities installed various computer and computing devices as searches are received. In other embodiments, the information, data, and statistics with regard to searches may be collected by instances of the tab search utility and uploaded to or retrieved by a process that executes on the one or more servers. The information and data collected may include information with regard to the specifics of the searches. The information collected may also include data with regard to the user, such as known demographic and identifying data which may include actual user identities, globally unique identifiers (GUIDs) of the computing devices from which searches are received, web browser application data, times of day searches are received from particular, and other information, data and statistics. This information, data, and statistics, or portions thereof, may then be sent to third-parties or made available for download by third-parties.

Figure 7:
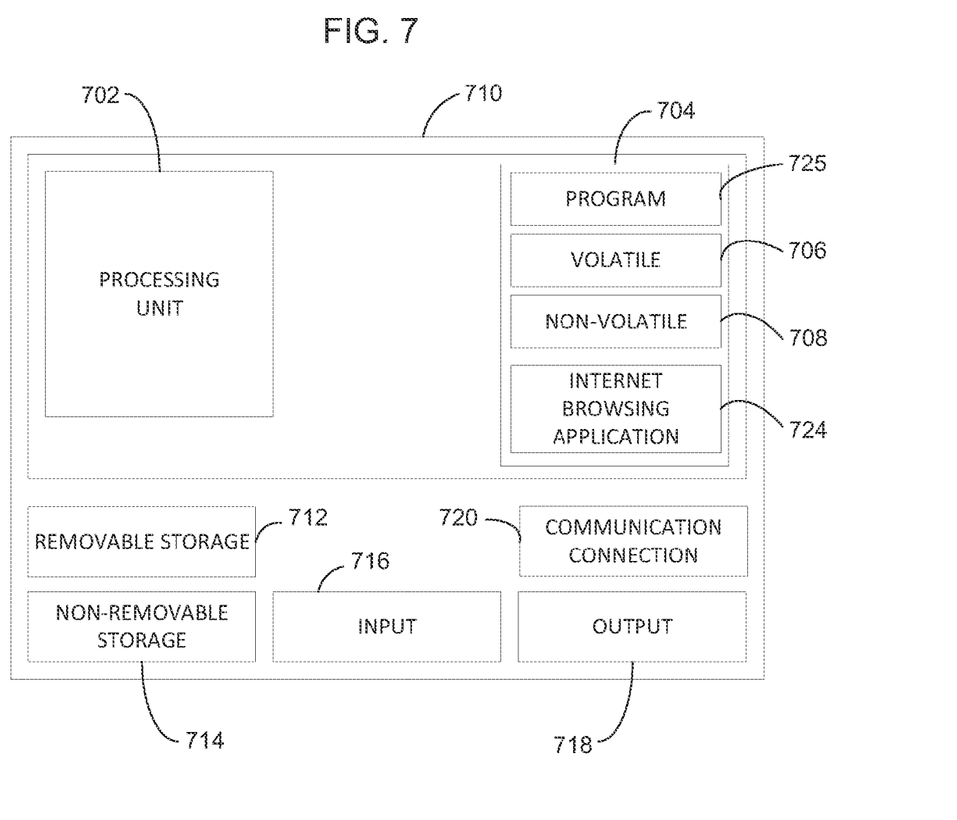
FIG. 7 is a block diagram of a computing device according to an example embodiment.

FIG. 7 is a block diagram of a computing device according to an example embodiment. The computing device of FIG. 7 is an example of a computing device upon which the tab search utility may execute. In one embodiment, multiple such computer systems are utilized in a distributed network to implement multiple components in a transaction-based environment. An object-oriented architecture may be used to implement such functions and communicate between the multiple systems and components. One example of a computing device in the form of a computer 710 may include a processing unit 702, memory 704, removable storage 712, and non-removable storage 714. Memory 704 may include volatile memory 706 and non-volatile memory 708. Computer 710 may include or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium. For example, an Internet browsing application 724 and a computer program 725, such as a tab search utility may be stored in the memory 704 and executed by one or more processing units 702 to perform one or more of the methods illustrated and described herein. In other embodiments, the computer program 725 including the tab search utility may be a thin client or a portion of a device operating system implemented in a cloud computing architecture where the majority of processing takes place on one or more remote servers accessed via a network and the thin client or portion of the device operating system focuses primarily on presenting content received from the one or more remote servers.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computer-readable storage medium, with instructions stored thereon, which when executed by at least one processor of a computing device, cause the computing device to:
within an Internet browsing application, present a search box adjacent to a last of at least one tab header in a tabbed area of the Internet browsing application, the tabbed area defined as an area of the Internet browsing application where tab headers are displayed, the search box displayed within the tabbed area but outside of any tab and outside of any tab header of any tab, the search box to receive text input of a search query to be submitted against at least one search engine, add at least one tracking code, associated with at least one of a user and the Internet browsing application, to the search query submitted to each respective search engine of the at least one search engine, the Internet browsing application including an address bar, the tabbed area including at least one tab header that can be selected to view a browsing area associated with the selected tab, the browsing area of each tab to provide a view of content retrieved by the Internet browsing application, at least a portion of the content retrieved from a location identified in the address bar;
upon addition of a new tab header to the tabbed area:
identify a new area within the tabbed area to present the search box, the new area adjacent to a last tab header presented in the tabbed area;
remove the presented search box; and
redraw the search box in the identified new area to present the search box.

2. The computer-readable storage medium of claim 1, with further instructions stored thereon which when executed by the at least one processor, cause the computing device to:

receive search results in response to a search query received in the search box and submitted to the at least one search engine;
aggregate search results from each search engine to which the query was submitted;
present the aggregated search results as a web page in a browsing area of a tab of the at least one tab.

3. The computer readable storage medium of claim 2, wherein presenting the aggregated search results as a web page in a browsing area of a tab of the at least one tab includes creating a new tab and presenting the aggregated search results in a web page within the new tab.

4. The computer-readable storage medium of claim 1, with further instructions stored thereon which when executed by the at least one processor, cause the computing device to:
 receive selection input selecting at least one of a plurality of search engines for search query submission; and
 store the configuration based on the selection, wherein the browser operates according to the stored configuration.

5. The computer-readable storage medium of claim 1, with further instructions stored thereon which when executed by the at least one processor, cause the computing device to:
 collect search and usage data;
 store the search and usage data; and
 send the search and usage data to another computer.

6. The computer-readable storage medium of claim 1, with further instructions stored thereon which when executed by the at least one processor, cause the computing device to:
 intercept text input into any of the following Internet browser application components:
  the search box,
  default search box,
  address bar,
  new tab search, and
  start/home page search; and
 submit the inputted text to at least one search engine.

7. The computer-readable storage medium of claim 1, with further instructions stored thereon which when executed by the at least one processor, cause the computing device to:
 generate a visual output including a control button located next to the search box, the control button presenting content from a third party.

8. The computer-readable storage medium of claim 1, with further instructions stored thereon which when executed by the at least one processor, cause the computing device to:
 retrieve, at a configurable time interval and from a predetermined Internet address, a configuration file comprising:
  a list of search engines available for use,
  a tracking code for each search engine in the list,
  one search engine from the list that is marked as the default search engine,
  content for a search page on any new tab, and
  reporting configurations.

9. A method, comprising:
 within an Internet browsing application, presenting a search box adjacent to a last of at least one tab header in a tabbed area of the Internet browsing application, the tabbed area defined as an area of the Internet browsing application where tab headers are displayed, the search box displayed within the tabbed area but outside of any tab and outside of any tab header of any tab, the search box to receive text input of a search query to be submitted against at least one search engine, the Internet browsing application including an address bar, the tabbed area including at least one tab header that can be selected to view a browsing area associated with the selected tab, the browsing area of each tab to provide a view of content retrieved by the Internet browsing application, at least a portion of the content retrieved from a location identified in the address bar;
 upon addition of a new tab to the tabbed area:
  identifying a new area within the tabbed area to present the search box, the new area adjacent to a last tab header presented in the tabbed area; and
  replacing the presented search box with a new search box in the identified area;
 receiving text in the search box of a search query to be submitted against at least one search engine; and
 performing a search based on the text received into the search box, performing of the search including:
  adding a tracking code to text received into the search box to form a query submission, the tracking code associated with an account to be credited by a search engine for submission of a search;
  submitting the query submission to at least one search engine.

10. The method of claim 9, further comprising:
collecting search and usage data;
storing the search and usage data; and
sending the search and usage data to another computer.

11. The method of claim 9, further comprising:
intercepting text input into at least one of the Internet browsing application components comprising:
 the search box,
 default search box,
 address bar,
 new tab search, and
 start/home page search;
submitting the inputted text to a remote network location and receiving, in response thereto, a redirect to a search engine to which the search is to be submitted to; and
submitting the search to the search engine redirected to.

12. The method of claim 11, further comprising:
disabling at least one of the internet browsing application components comprising:
 the default search box,
 the address bar,
 the new tab search, and
 the start/home page search.

13. The method of claim 9, further comprising:
generating a visual output including a control button located next to the search box, the control button presenting content from a third party.

14. The method of claim 9, further comprising:
retrieving, at a configurable time interval and from a predetermined Internet address, a configuration file comprising:
 a list of search engines available for use,
 a tracking code for each search engine in the list,
 one search engine from the list that is marked as the default search engine,
 content for a search page on any new tab, and
 reporting configurations.

15. A computer program product implementing the method of claim 9.

16. The computer program product of claim 15, wherein the product is bundled with other software for distribution.

17. A system, comprising:
 at least one processor, at least one memory device, and at least one network interface device operatively coupled via a bus;

an Internet browsing application stored in the at least one memory device and executable on the at least one processor to:
  within an Internet browsing application, the Internet browsing application including an address bar, a tabbed area defined as an area of the Internet browsing application where tab headers are displayed, the tabbed area including at least one tab that can be selected to view a browsing area associated with the selected tab, the browsing area of each tab providing a view of content retrieved by the Internet browsing application, at least a portion of the content retrieved from a location identified in the address bar;
an add-on to the Internet browsing application, stored in the at least one memory device and executable by the at least one processor to:
  present a search box within the tabbed area of the Internet browsing application and adjacent to a last of the at least one tab header in a tabbed area but outside of any tab and outside of any tab header of any tab, the search box to receive text input of a search query to be submitted to at least one search engine,
  upon addition of a new tab to the tabbed area:
    identify a new area within the tabbed area to present the search box, the new area adjacent to a last tab header presented in the tabbed area; and
    replace the presented search box with a new search box in the identified area;
  receive text in the search box of a search query to be submitted to at least one search engine; and
  perform a search based on the text received into the search box, performance of the search including:
    add a tracking code to text received into the search box to form a query submission, the tracking code associated with at least one of a user and the Internet browsing application; and
    submitting the query submission to at least one search engine.

18. The system of claim 17, wherein the add-on to the Internet browsing application is further executable by the at least one processor to:
  collect search and usage data;
  store the search and usage data; and
  periodically send the search and usage data to another computer.

19. The system of claim 17, wherein the add-on to the Internet browsing application is further executable by the at least one processor to:
  retrieve, at a configurable time interval and from a predetermined Internet address, a configuration file comprising:
    a list of search engines available for use,
    a tracking code for each search engine in the list,
    one search engine from the list that is marked as the default search engine,
    content for a search page on any new tab, and
    reporting configurations.

20. The system of claim 17, wherein the add-on to the Internet browsing application is further executable by the at least one processor to:
  generate a visual output including a control button located next to the search box, the control button presenting content from a third party.

21. The system of claim 17, wherein the add-on to the Internet browsing application is further executable by the at least one processor to:
  receive search results in response to a search query received in the search box and submitted to the at least one search engine;
  aggregate search results from each search engine to which the query was submitted;
  present the aggregated search results as a web page in a browsing area of a tab of the at least one tab.

* * * * *